March 25, 1952
LE ROY ROSE
2,590,431
WATER AERATOR AND FILTER
Filed Dec. 15, 1947
2 SHEETS—SHEET 1
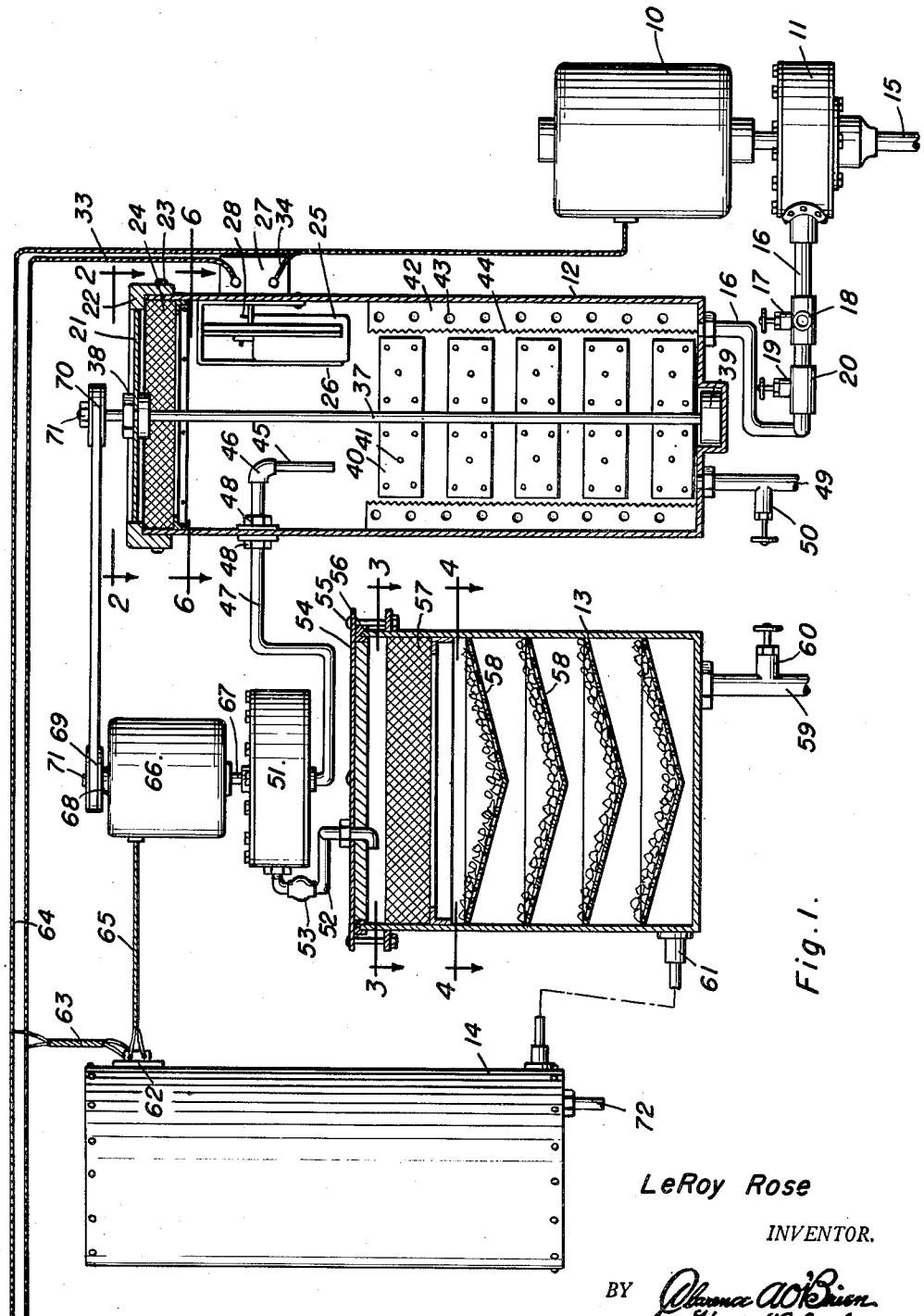
Fig. I.
LeRoy Rose
INVENTOR.

March 25, 1952  LE ROY ROSE  2,590,431
WATER AERATOR AND FILTER
Filed Dec. 15, 1947  2 SHEETS—SHEET 2
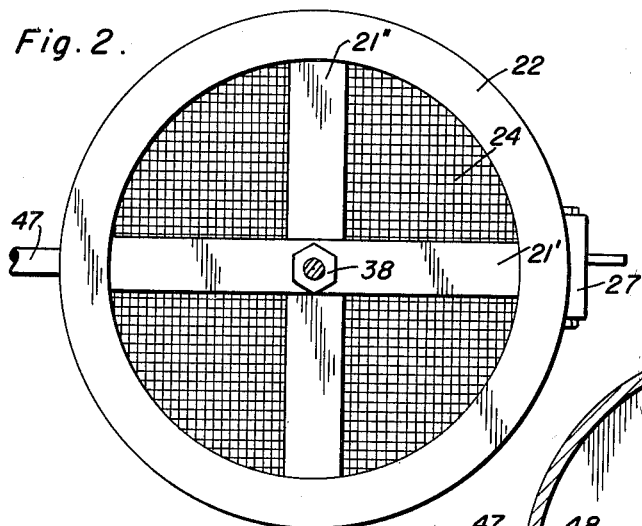
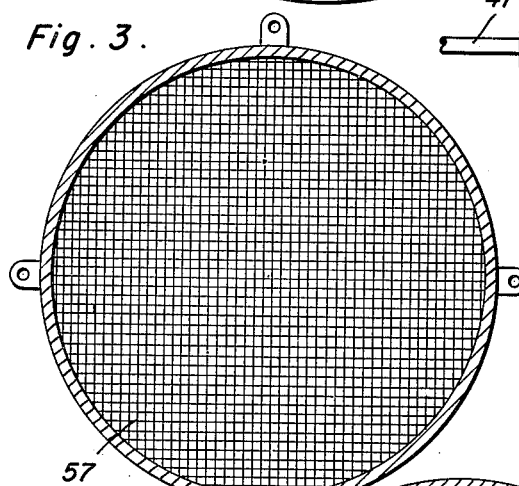
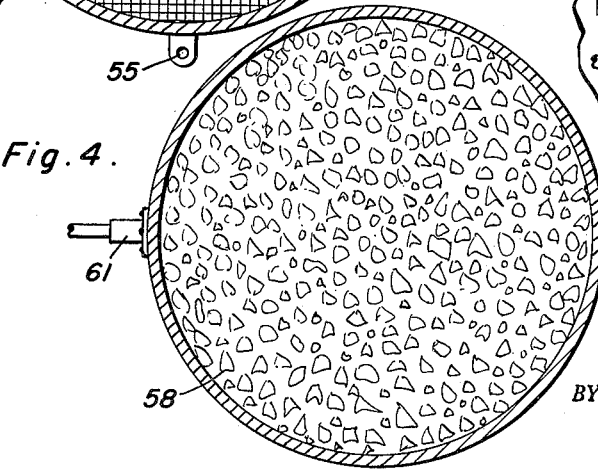
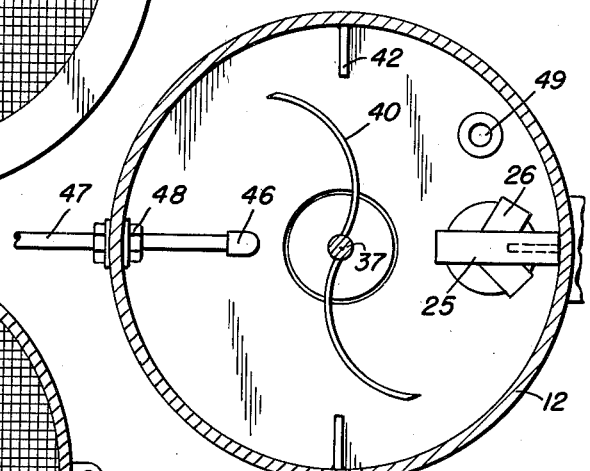
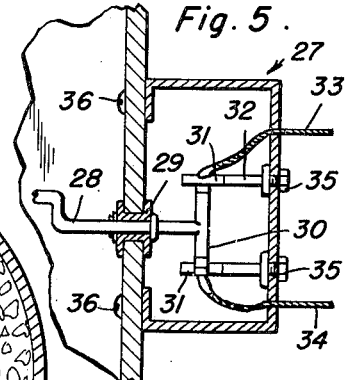
LeRoy Rose
INVENTOR.

Patented Mar. 25, 1952

2,590,431

UNITED STATES PATENT OFFICE 2,590,431

WATER AERATOR AND FILTER

Le Roy Rose, Bradenton, Fla.

Application December 15, 1947, Serial No. 791,691

2 Claims. (Cl. 210—16)

This invention relates to a water aerator and filter apparatus and more specifically pertains to a household water treating apparatus.

An object of the invention is to provide an apparatus for the continuous treatment of water.

Another object is to purify said water by the elimination of obnoxious odors and foreign elements.

A further object of the invention is to provide aeration means whereby obnoxious gasses, such as hydrogen sulphide are removed and filter means, whereby iron oxide and algae are eliminated.

A still further object of the invention is to provide an efficient control means, whereby the filter and aerator are automatically and simultaneously operated.

A more specific object is to provide a novel float control and aerator, whereby movement of said control acts to operate the water supply pump.

Other objects and advantages of the invention will more fully appear from the following detail description, taken in connection with the accompanying drawings, in which:

Figure 1 is a diagrammatic view of the structure embodying the present invention;

Figure 2 is a plan view taken along the line 2—2 of the aerator;

Figure 3 is a plan view taken along the line 3—3 of the filter, and showing the filter screen;

Figure 4 is a plan view taken on the line 4—4 of Figure 1 and shows additional filter means;

Figure 5 is a sectional view of the aerator float control means, and

Figure 6 is a plan view along the line 6—6 of the aerator and illustrates the agitator construction.

As is illustrated diagrammatically in Figure 1, 10 is a motor, 11 is a pump, 12 is the aerator, 13 is the filter tank and 14 is the storage tank.

Referring to Figure 1, the motor 10 is connected to the pump 11, which pump operates to supply well water through inlet pipes 15, leading from a source of supply to aerator tank 12, by a conduit 16 connected to the outlet of the pump. Valves 17 and 19, to be later more fully described, are contained in the conduit 16.

Referring to the aerator 12, a tank cover 21, as may best be seen in Figures 1 and 2, consisting of two narrow strips 21' and 22", and intersecting at right angles, are maintained against displacement by an annular rim 22, which includes a depending annular flange 23 bolted to the tank 12 by suitable means. A cylindrical screen 24 having flat end walls is positioned directly below the cover 21, and permits escape of obnoxious odors to the atmosphere. A float 25, retained in float guide 26, is operatively connected to a switch 27, by means of a rod 28 (Figures 1 and 5) which may be of plastic or other suitable material, in order to attain automatic control of the supply of well water as will later be explained. Included within said aerator tank, as best shown in Figure 1, is a shaft 37 rotatably journaled at the bottom of the tank at 39, and extending through the tank and through the cover 21, and held in position by lock nut and bearing 38. Positioned at the end of the shaft is a pulley 70 to be more fully described hereinafter.

Agitator blades 40 are mounted along the length of said shaft and include apertures 41, to assist in the aeration of the water. Any desired number of agitator blades may be employed. As may best be seen by examination of Figure 6, the blades 40 are curved in an S-shape in order to more efficiently agitate the water. Vertical fins 42 (two of which are shown) are positioned in the tank 12 and extend inwardly therefrom to a point adjacent the ends of the agitator blades. These fins are apertured at 43 and include serrated edges 44. These fins assist in the aeration step and also serve to prevent rotation of the water within the tank, when the agitator is rotated. Thus a maximum efficiency in aeration is obtained. A drain pipe 49, controlled by drain valve 50, is supplied at the bottom of the tank.

A conduit pipe 45, preferably of half inch size, is connected to outlet pipe 47 by means of elbow 46 and is retained in the upper section of the aerator by means of lock nuts 48. Conduit 47 connects to the intake of pump 51 (see Figure 1) which, in turn, is operated by filter motor 66. A check valve 53, positioned in the conduit 52, prevents back flow of water from the tank 13 to the pump. The filter tank 13 includes a cover 54 suitably bolted at 55 and contains a gasket 56 of any desired material, to seal the chamber 13. A cylindrical screen container 57 having flat end walls will contain charcoal, though any other desired material may be supplied, as is well known in the art. Of course, suitable vertically spaced filters 58 will be disposed in the tank. Suitable drain means 59, and valve 60, are provided at the bottom of tank 13. A conduit 61 leads from the bottom of the filter tank to a pressure tank 14, of usual construction.

Included within the upper section of the container 14, is a pressure switch of a standard type and is well known by skilled operators in the art. The switch 62 connects to a float in the container (not shown). Insulated conductor 63 leads to a source of power 64 and conductor 65 leads to the motor 66, as will shortly be explained.

A short conduit 67, serves to connect pump 51 and motor 66, and a motor shaft 68 has a pulley keyed on the extending end thereof. A pulley belt 69, is connected to the motor shaft pulley and pulley 70 carried by the extending end of shaft 37. Lock nuts 71 retain the pulleys in position.

In the operation of the structure, service pipe 72 leads from the pressure tank to a faucet (not shown). When the faucet is open, the float within the tank will fall and trip the operating switch 62. Filter motor 66 performs a dual function. It pumps the water from aerator 12 to filter 13 by conduits 45, 47 and 52 and also supplies rotation to the shaft 37. Simultaneously with the actuation of the pump, the agitators 40 and shaft 37 are rotated by means of pulley belt 69 in order to eliminate objectionable odors such as carbon dioxide or hydrogen sulphide. When the water from the tank 12 is withdrawn, the float 25 will fall and rotate rod 28 (Figure 5) journaled at 29 and extending into switch box 27. This causes the metal contact 30 to close the circuit by means of contact points 31 and suitable power conductors 33 and motor line 34. The contacts are suitably insulated as shown at 32 and rigidly maintained by lock nuts 35. Bolts 36 retain the switch 27 to the chamber 12. Motor 10 now operates water pump 11 to supply well water to the aerator. When the float 25 attains a predetermined position, rod 28 rotates to open the circuit.

When it is desired to flush tank 12 or 13, valve 19 in section 20 of conduit 16 is closed and valve 17 is opened. A hose, connected at 18, is supplied to either pipe 49 in the aerator 12 or to pipe 59 in the filter 13, and permits flushing.

While any size tank may be employed, I prefer to use those of 40 gallons capacity.

While in the foregoing description, I have given specific details of operation and suggested specific structure, it will be understood that both may be varied widely without departing from the spirit of my invention. I wish it to be understood that I do not desire to be limited to the exact details of construction shown and described, for obvious modifications will occur to a person skilled in the art.

Having described the invention, what is claimed as new is:

1. In a liquid purification and supply system including a well pump delivering water and occluded gases, an aerator tank connected at its lower end to said pump, means associated with said tank and controlled by the liquid in the tank for operating said well pump, a filter tank, a conduit connecting system between the upper portions of said aerator tank and filter tank, a second pump associated with said conduit system for forcing liquid though the connecting system, a prime mover for said second pump, an agitator rotatably mounted in said aerator tank and actuated by the prime mover for said second pump, a pressure tank connected at its lower end with the lower end of said filter tank for receiving liquid therefrom, and means controlled by the withdrawal of liquid from the pressure tank for automatically operating said prime mover.

2. In a liquid purification and supply system including a well pump delivering water and occluded gases, an aerator tank, a valved conduit system connected between said pump and aerator tank, a prime mover for said pump, a float controlled switch for said prime mover operatively connected to said aerator tank, an agitator rotatably mounted in said aerator tank, a filter tank, pumping means associated with said aerator and filter tanks for withdrawing liquid from the aerator tank into the filter tank, a second prime mover operatively connected to said agitator and pumping means for commonly and simultaneously actuating said agitator and pumping means, a pressure tank communicated with said filter tank for receiving liquid therefrom, and means controlled by the withdrawal of liquid from the pressure tank for automatically controlling said second prime mover.

LE ROY ROSE.

REFERENCES CITED

The following references are of record in the file of this patent:

UNITED STATES PATENTS

| Number | Name | Date |
|---|---|---|
| 156,357 | Jones et al. | Oct. 27, 1874 |
| 1,765,338 | Jones et al. | June 17, 1930 |
| 1,985,435 | Watson | Dec. 25, 1934 |
| 2,048,158 | Goodwin | July 21, 1936 |
| 2,064,861 | Stroud | Dec. 22, 1936 |
| 2,239,612 | Lawlor | Apr. 22, 1941 |